(12) United States Patent
Sun et al.

(10) Patent No.: US 11,758,478 B2
(45) Date of Patent: Sep. 12, 2023

(54) POWER SAVING BASED ON A COMBINED TIMING INDICATION AND SEARCH SPACE SET GROUP INDICATION

(71) Applicant: QUALCOMM Incorporated, San Diego, CA (US)

(72) Inventors: Jing Sun, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 16/949,301

(22) Filed: Oct. 23, 2020

(65) Prior Publication Data

US 2021/0136685 A1    May 6, 2021

Related U.S. Application Data

(60) Provisional application No. 62/931,582, filed on Nov. 6, 2019.

(51) Int. Cl.
*H04W 52/02* (2009.01)
*H04W 76/27* (2018.01)
*H04W 72/23* (2023.01)

(52) U.S. Cl.
CPC ... *H04W 52/0216* (2013.01); *H04W 52/0235* (2013.01); *H04W 52/0274* (2013.01); *H04W 72/23* (2023.01); *H04W 76/27* (2018.02)

(58) Field of Classification Search
CPC ......... H04W 52/0216; H04W 52/0235; H04W 52/0274; H04W 72/042; H04W 76/27; H04W 52/0212; H04W 52/0225; H04W 52/0209; Y02D 30/70
See application file for complete search history.

(56) References Cited

U.S. PATENT DOCUMENTS

| | | |
|---|---|---|
| 2013/0301490 A1 | 11/2013 | He et al. |
| 2019/0254110 A1 | 8/2019 | He et al. |
| 2020/0267643 A1* | 8/2020 | Wu .................. H04L 5/0053 |
| 2020/0314811 A1* | 10/2020 | Lin .................. H04L 5/0053 |
| 2020/0389874 A1* | 12/2020 | Lin .................. H04L 5/0053 |
| 2021/0105716 A1* | 4/2021 | Wu .................. H04L 41/0806 |
| 2022/0159702 A1* | 5/2022 | Seo .................. H04W 72/1273 |
| 2022/0167386 A1* | 5/2022 | Takeda ............. H04W 52/0216 |

(Continued)

OTHER PUBLICATIONS

3GPP TSG RAN WG1 Meeting #98-Bis; R1-1911563; Source: MediaTek Inc.; Title: Offline Summary for Cross-Slot Scheduling Adaptation; Chongqing, China, Oct. 14-20, 2019 (Year: 2019).*

(Continued)

*Primary Examiner* — Mohammed S Chowdhury
(74) *Attorney, Agent, or Firm* — Harrity & Harrity LLPQualcomm Incorporated

(57) ABSTRACT

Various aspects of the present disclosure generally relate to wireless communication. In some aspects, a user equipment (UE) may receive downlink control information (DCI) that includes a combined indication of a minimum timing value, associated with a timing for transmission or reception of a communication corresponding to the DCI, and a search space set group. The UE may monitor the search space set group, or commence a sleep mode, based at least in part on the DCI. Numerous other aspects are provided.

24 Claims, 9 Drawing Sheets

(56) References Cited

U.S. PATENT DOCUMENTS

2022/0225394 A1* 7/2022 Tie .................. H04L 5/0094

OTHER PUBLICATIONS

3GPP TSG RAN WG1 Meeting #98bis; R1-1910077; Source: Huawei, HiSilicon; Title: Procedure of cross-slot scheduling for UE power saving; Chongqing, China, Oct. 14-20, 2019. (Year: 2019).*

3GPP TSG RAN WG1 #98bis; R1-1910385; Source: OPPO; Title: Further considerations on cross-slot scheduling for power saving, Chongqing, China, Oct. 14-20, 2019. (Year: 2019).*

3GPP TSG RAN WG1 Meeting #98-Bis; R1-1911058; Source: MediaTek Inc.; Title: Ramaining Details for Adapation of Cross-Slot Scheduling, Chongqing, China, Oct. 14-20, 2019. (Year: 2019).*

CATT: "PDCCH-Based PowerSaving Signal/Channel Design", 3GPP Draft, R1-1906350, 3GPP TSG RAN WG1 Meeting #97, PDCCH Based Power Saving Signal Channel Design, 3rd Generation Partnership Project (3GPP), Mobile Competence Centre, 650, Route Des Lucioles, F-06921, Sophia-Antipolis Cedex, F, vol. RAN WG1. no. Reno. USA, May 13, 2019-May 17, 2019, May 13, 2019 (May 13, 2019), XP051727800, pp. 1-14, Retrieved from the Internet: URL:http://www.3gpp.org/ftp/Meetings%5F3GPP%5FSYNC/RAN1/Docs/R1%2D1906350%2Ezip [retrieved on May 13, 2019]1. 3. 4.4.

Qualcomm Incorporated: "Cross-Slot Scheduling PowerSaving Techniques", 3GPP Draft, R1-1911130, 3GPP TSG-RAN WG1 #98bis , Cross-Slot Scheduling PowerSaving Techniques, 3rd Generation Partnership Project (3GPP), Mobile Competence Centre, 650, Route Des Lucioles, F-06921 Sophia-Antipolis Cedex, F, vol. RAN WG1. no. Chongqing. China, Oct. 14, 2019-2019102, Oct. 5, 2019 (Oct. 5, 2019), XP051808853, pp. 1-18, Retrieved from the Internet: URL:https://ftp.3gpp.org/tsg_ran/WG1_RL1/TSGR1_98b/Docs/R1-1911130.zip R1-1911130 Cross-slot scheduling power saving techniques.docx [retrieved on Oct. 5, 2019] 2.1.2 2.2.2 2.2.3.

Samsung: "On UE Adaptation Schemes", 3GPP Draft, R1-1902318, 3GPP TSG RAN WG1 RAN1 #96, On UE Adaptation Schemes, 3rd Generation Partnership Project (3GPP), Mobile Competence Centre, 650, Route Des Lucioles, F-06921, Sophia-Antipolis Cedex, France, vol. RAN WG1, no. Athens, Greece, Mar. 25, 2019-Mar. 1, 2019, Feb. 15, 2019 (Feb. 15, 2019), XP051600012, 15 Pages, Retrieved from the Internet: URL: http://www.3gpp.org/ftp/tsg%5Fran/WG1%5FRL1/TSGR1%5F96/Docs/R1%2D1902318%2Ezip [retrieved on Feb. 15, 2019] Section 2.8, 2.1.

CATT: "PDCCH-Based Power Saving Signal/Channel Design", 3GPP Draft, R1-1905330, 3GPP TSG RAN WG1 Meeting #97, PDCCH Based Power Saving Signal Channel Design, 3rd Generation Partnership Project (3GPP), Mobile Competence Centre, 650, Route Des Lucioles, F-06921, Sophia-Antipolis Cedex, F, vol. RAN WG1. no Reno. USA, May 13, 2019-May 17, 2019, May 13, 2019 (May 13, 2019), XP051727800, pp. 1-14, Retrieved from the Internet: URL: http://www.3gpp.org/ftp/Meetings%5F3GPP%5FSYNC/RAN1/DOCS/R1%2D1906350%2Ezip [retrieved on May 13, 2019], 1. 3. 4.4.

International Search Report and Written Opinion—PCT/US2020/070695—ISA/EPO—dated Jan. 22, 2021.

Qualcomm Incorporated: "Cross-Slot Scheduling Power Saving Tecnniques," 3GPP Draft, R1-1911130, 3GPP TSG-RAN WG1 #98bis, Cross-Slot Scheduling Power Saving Techniques, 3rd Generation Partnership Project (3GPP), Mobile Competence Centre, 650, Route Des Lucioles, F-06921 Sophia-Antipolis Cedex, F, vol. RAN WG1. no. Chongqing. China, Oct. 14, 2019-2019102, Oct. 5, 2019 (Oct. 5, 2019), XP051808853, pp. 1-18, Retrieved from the Internet: URL:https://ftp.3gpp.org/tsg_ran/WG1_RL1/TSGR1_98b/Docs/R1-1911130.zip R1-1911130 Cross-slot scheduling power saving techniques.docx [retrieved on Oct. 5, 2019] 2.1.2 2.2.2 2.2.3.

Samsung: "On UE Adaptation Schemes", 3GPP Draft, R1-1902318, 3GPP TSG RAN WG1 RAN1 #96, on UE Adaptation Schemes, 3rd Generation Partnership Project (3GPP), Mobile Competence Centre, 650, Route Des-ucioles, F-06921, Sophia-Antipolis Cedex, France, vol. RAN WG1, no. Athens, Greece, Mar. 25, 2019-Mar. 1, 2019, Feb. 15, 2019 (Feb. 15, 2019), XP051600012, 15 Pages, Retrieved from the Internet: URL: http://www.3gpp.org/ftp/tsg%5Fran/WG1%5FRL1/TSGR1%5F96/DOCS/R1%2D1902318%2Ezip [retrieved on Feb. 15, 2019] Section 2.8, 2.1.

* cited by examiner

POWER SAVING BASED ON A COMBINED TIMING INDICATION AND SEARCH SPACE SET GROUP INDICATION

CROSS-REFERENCE TO RELATED APPLICATION

This Patent Application claims priority to U.S. Provisional Patent Application No. 62/931,582, filed on Nov. 6, 2019, entitled "POWER SAVING BASED ON A COMBINED TIMING INDICATION AND SEARCH SPACE GROUP INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power saving based on a combined timing indication and search space set group indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication performed by a user equipment (UE) includes receiving downlink control information (DCI) that includes a combined indication of a minimum timing value, associated with a timing for transmission or reception of a communication corresponding to the DCI, and a search space set group; and monitoring the search space set group, or commencing a sleep mode, based at least in part on the DCI.

In some aspects, a method of wireless communication performed by a base station includes determining a minimum timing value, associated with a timing for transmission or reception of a communication by a UE, and a search space set group for the UE; and transmitting DCI that includes a combined indication of the minimum timing value and the search space set group.

In some aspects, a UE for wireless communication includes memory; one or more processors coupled to the memory; and instructions stored in the memory and operable, when executed by the one or more processors, to cause the UE to: receive DCI that includes a combined indication of a minimum timing value, associated with a timing for transmission or reception of a communication corresponding to the DCI, and a search space set group; and monitor the search space set group, or commencing a sleep mode, based at least in part on the DCI.

In some aspects, a base station for wireless communication includes memory; one or more processors coupled to the memory; and instructions stored in the memory and operable, when executed by the one or more processors, to cause the base station to: determine a minimum timing value, associated with a timing for transmission or reception of a communication by a UE, and a search space set group for the UE; and transmit DCI that includes a combined indication of the minimum timing value and the search space set group.

In some aspects, a non-transitory computer-readable medium stores one or more instructions for wireless communication that, when executed by one or more processors of a UE, cause the UE to: receive DCI that includes a combined indication of a minimum timing value, associated with a timing for transmission or reception of a communication corresponding to the DCI, and a search space set group; and monitor the search space set group, or commencing a sleep mode, based at least in part on the DCI.

In some aspects, a non-transitory computer-readable medium stores one or more instructions for wireless communication that, when executed by one or more processors of a base station, cause the base station to: determine a minimum timing value, associated with a timing for transmission or reception of a communication by a UE, and a search space set group for the UE; and transmit DCI that includes a combined indication of the minimum timing value and the search space set group.

In some aspects, an apparatus for wireless communication includes means for receiving DCI that includes a combined indication of a minimum timing value, associated with a timing for transmission or reception of a communication corresponding to the DCI, and a search space set group; and means for monitoring the search space set group, or commencing a sleep mode, based at least in part on the DCI.

In some aspects, an apparatus for wireless communication includes means for determining a minimum timing value, associated with a timing for transmission or reception of a communication by a UE, and a search space set group for the UE; and means for transmitting DCI that includes a combined indication of the minimum timing value and the search space set group.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
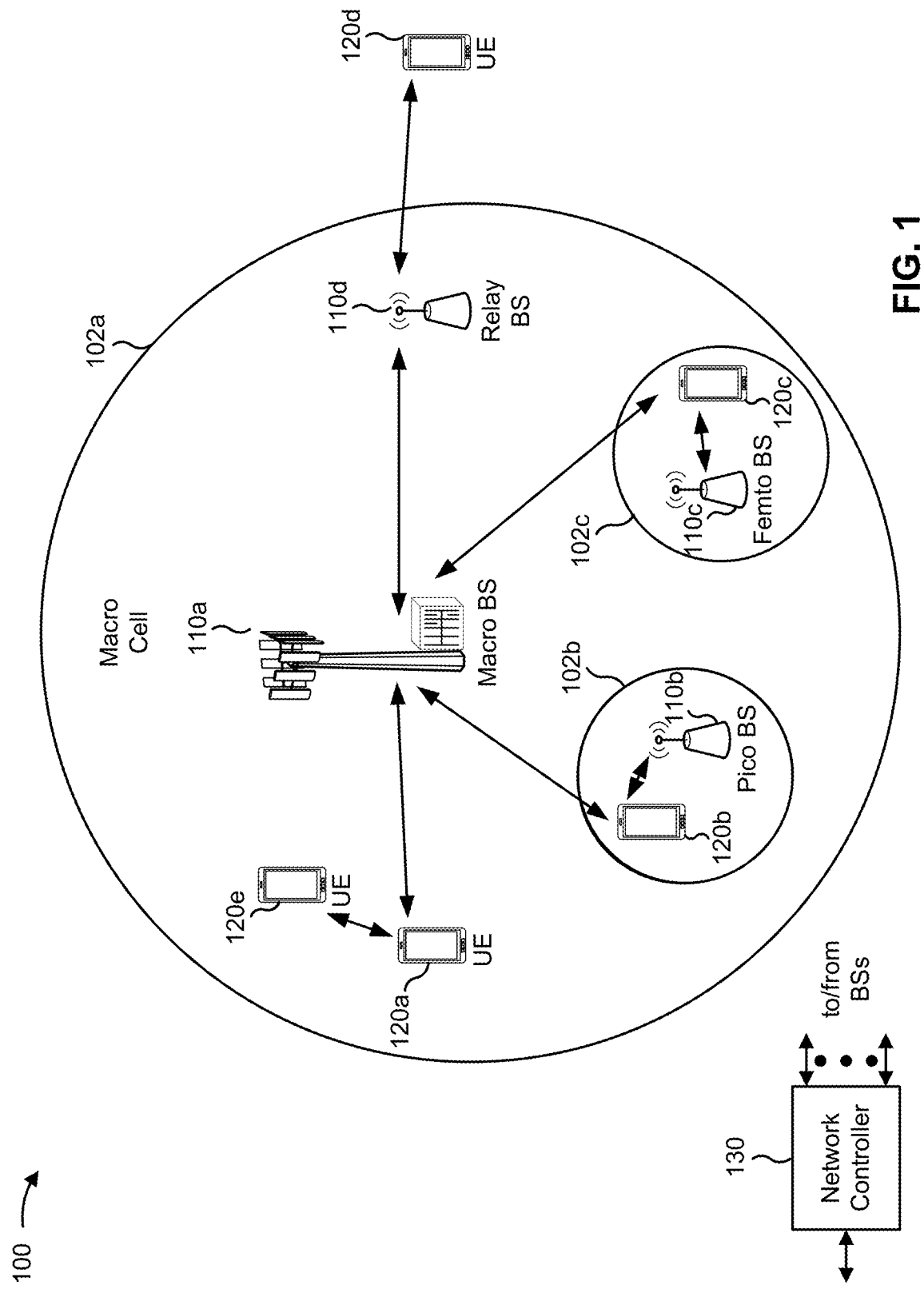
FIG. 1 is a block diagram conceptually illustrating an example of a wireless communication network, in accordance with various aspects of the present disclosure.

In some wireless communication systems, a UE may be configured with one or more timing values that the UE is to use for transmission or reception of communications. For example, the UE may be configured with a timing value associated with a timing between a downlink grant included in downlink control information (DCI) and reception of a corresponding downlink data communication (e.g., a K0 value), a timing value associated with a timing between reception of an uplink grant included in DCI and transmission of a corresponding uplink data communication (e.g., a K2 value), and/or the like. In some cases, DCI may indicate that the UE is to switch to using a particular timing value. For example, the UE may switch to using a larger timing value to enable power saving by the UE.

In some wireless communication systems, a UE may be configured with one or more search space set groups (e.g., groups of one or more search space sets) that the UE is to monitor for a physical downlink control channel (PDCCH). For example, the UE may be configured with a first search space set group that the UE is to use for mini-slot level monitoring outside of a channel occupancy time (COT), and a second search space set group that the UE is to use for slot level monitoring inside of a COT. In some cases, DCI, or another indication, may indicate that the UE is to switch to monitoring a particular search space set group. For example, the UE may switch to monitoring a smaller search space set group to enable power saving by the UE.

However, in some cases, an indication of a timing value that the UE is to use, and an indication of a search space set group that the UE is to use, may occur independently. For example, the UE may receive an indication to use a timing value that does not enable power saving, and an indication to use a search space set group that enables power saving. Accordingly, power saving by the UE may be lessened when the timing value and the search space set group are not coordinated for power saving.

Some techniques and apparatuses described herein provide a combined timing indication and search space set group indication for a UE. In some aspects, the UE may identify an association between a timing value and a search space set group. In some aspects, when the UE receives an indication from a base station to switch to the timing value, the UE also may switch to the search space set group based on the association. In this way, the timing value and the search space set group may be coordinated, thereby improving power saving by the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
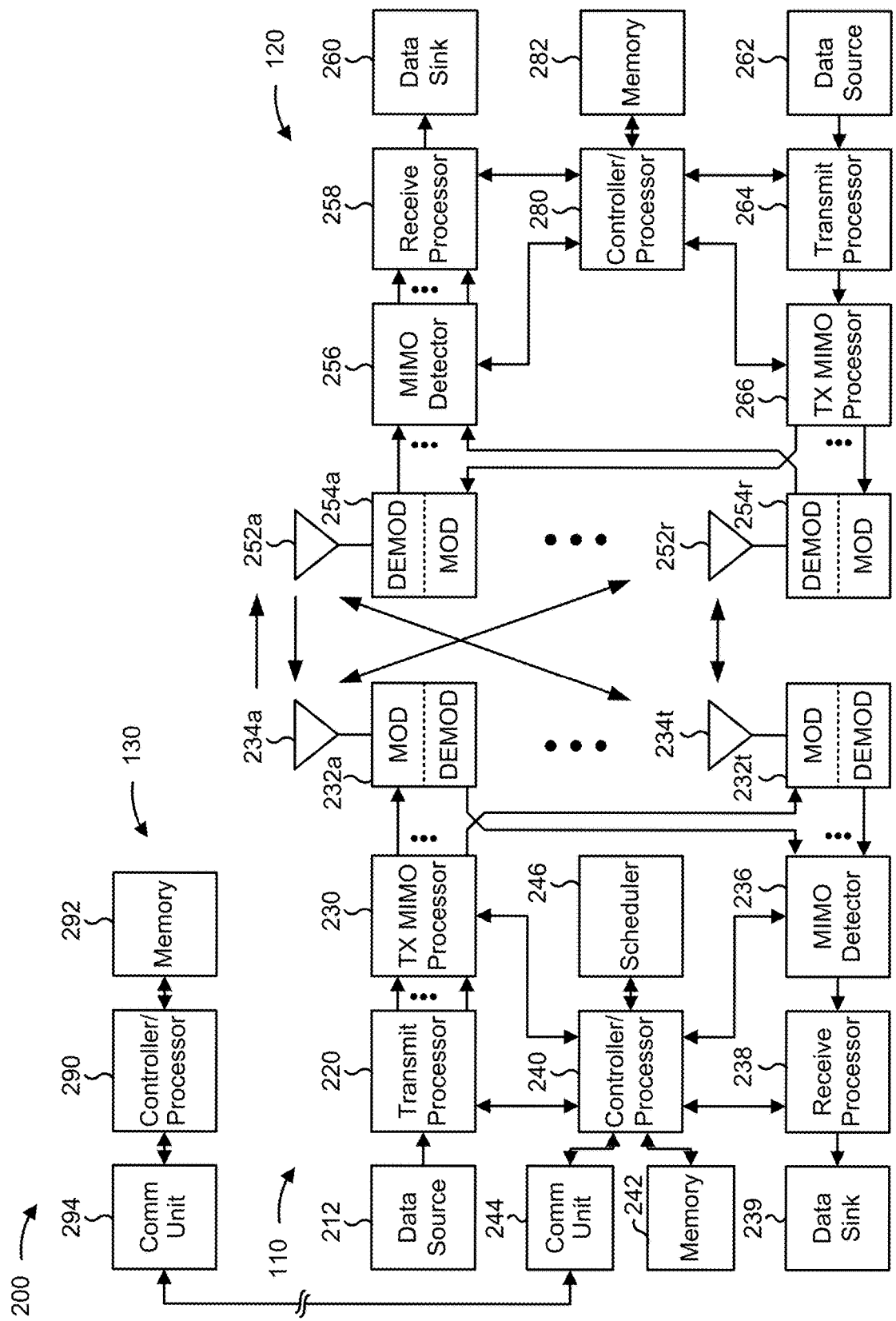
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power saving based on a combined timing indication and search space set group indication, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

Figure 7:
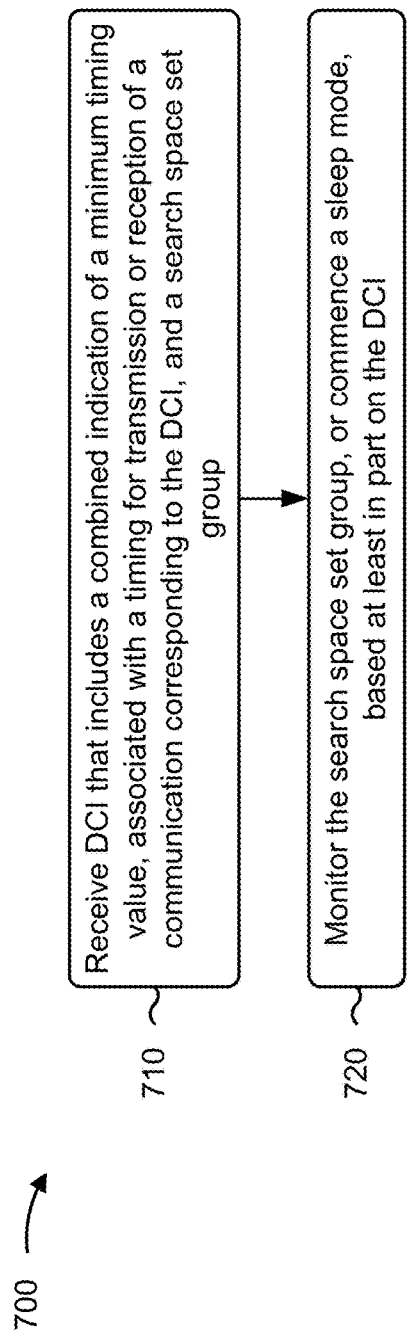
FIG. 7 is a diagram illustrating an example process performed, for example, by a UE, in accordance with various aspects of the present disclosure.
Figure 8:
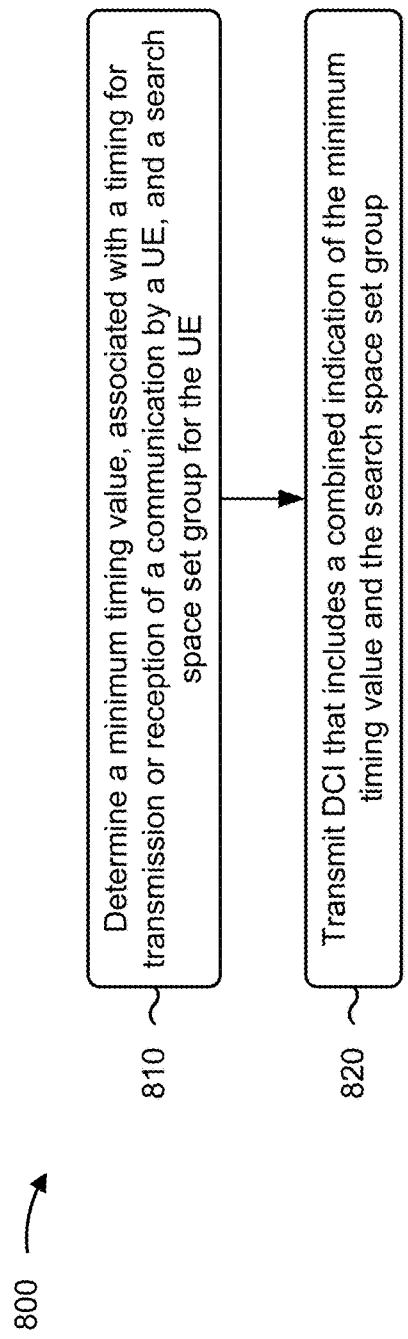
FIG. 8 is a diagram illustrating an example process performed, for example, by a base station, in accordance with various aspects of the present disclosure.

The stored program codes, when executed by processor 280 and/or other processors and modules at UE 120, may cause the UE 120 to perform operations described with respect to process 700 of FIG. 7, process 800 of FIG. 8, and/or other processes as described herein. The stored program codes, when executed by processor 240 and/or other processors and modules at base station 110, may cause the base station 110 to perform operations described with respect to process 700 of FIG. 7, process 800 of FIG. 8, and/or other processes as described herein. A scheduler 246 may schedule UEs for data transmission on the downlink and/or uplink.

In some aspects, UE 120 may include means for receiving downlink control information (DCI) that includes a combined indication of a minimum timing value, associated with a timing for transmission or reception of a communication corresponding to the DCI, and a search space set group, means for monitoring a search space set group, or commencing a sleep mode, based at least in part on the DCI, and/or the like. In some aspects, such means may include one or more components of UE 120 described in connection with FIG. 2.

In some aspects, base station 110 may include means for determining a minimum timing value, associated with a timing for transmission or reception of a communication by a UE, and a search space set group for the UE, means for transmitting DCI that includes a combined indication of the minimum timing value and the search space set group, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
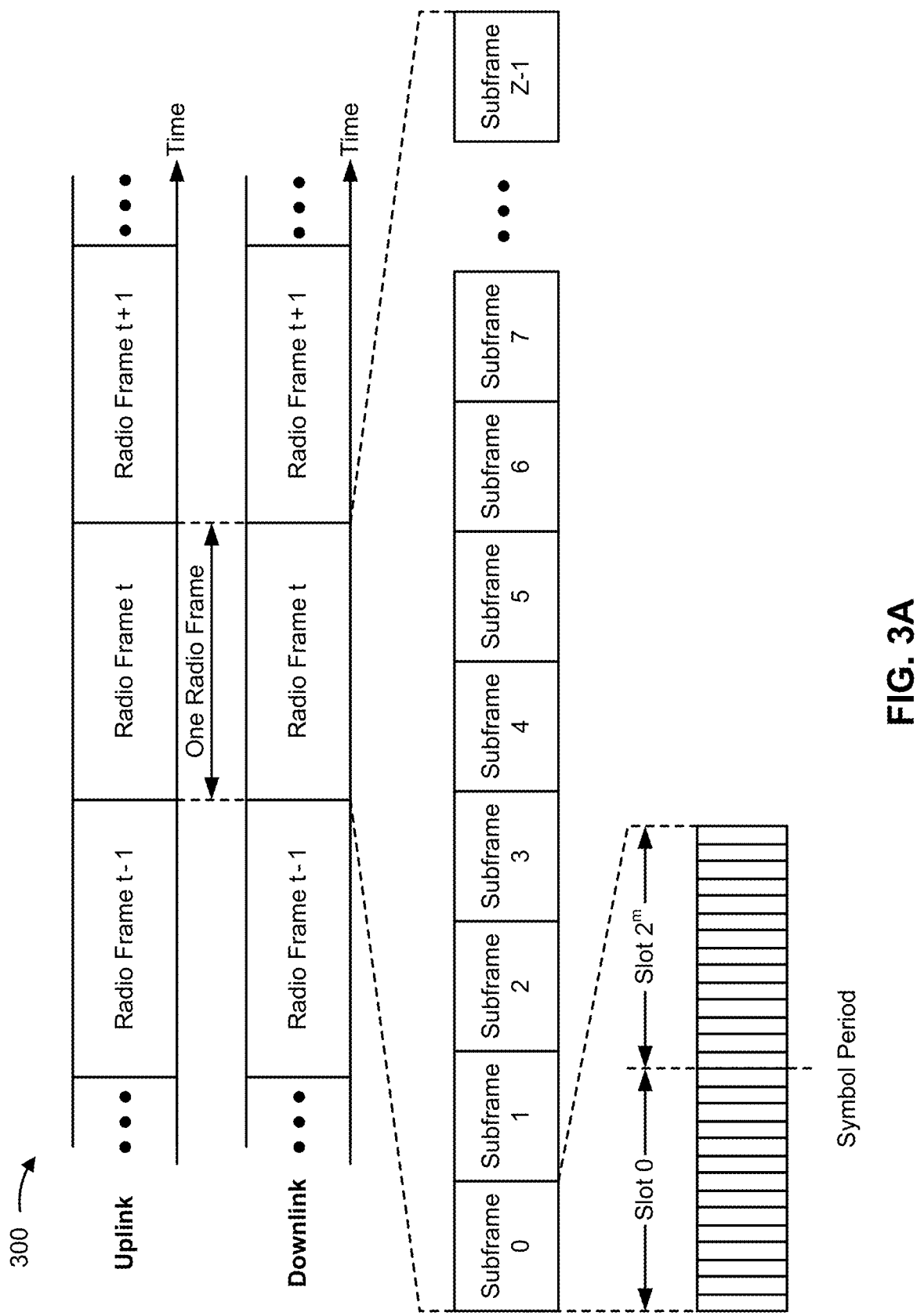
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1,2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
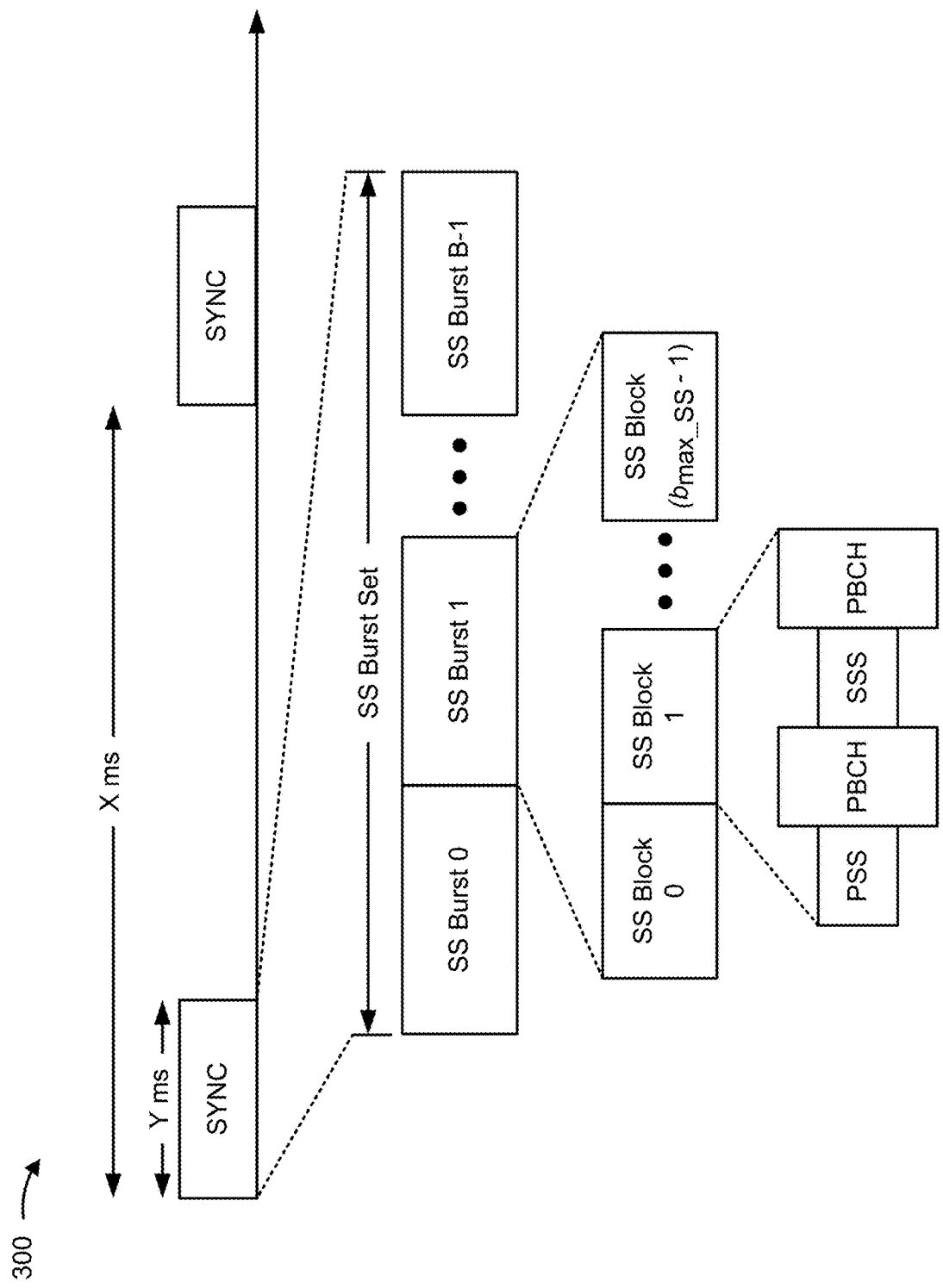
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
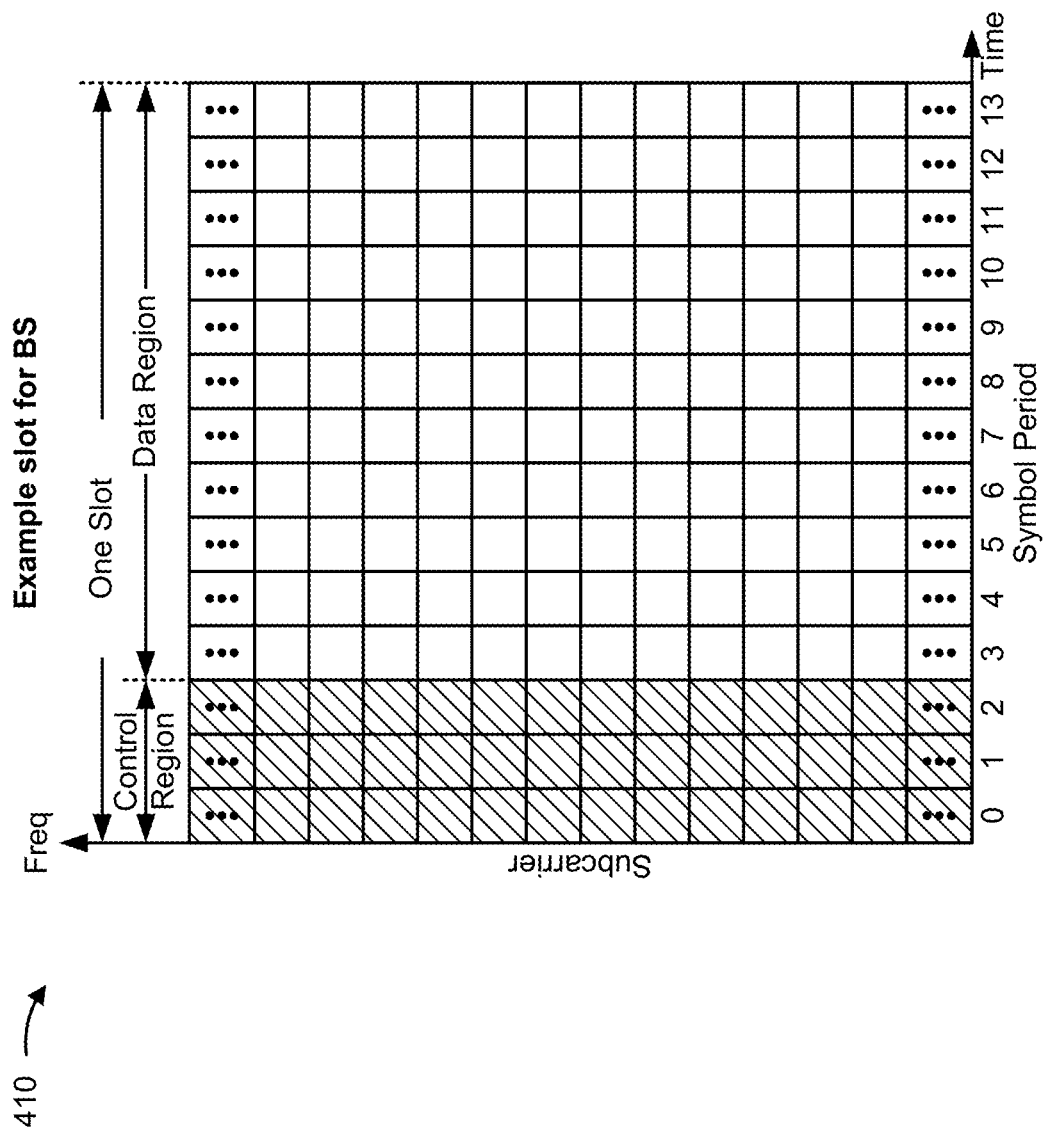
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q-1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using time division duplexing (TDD). NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
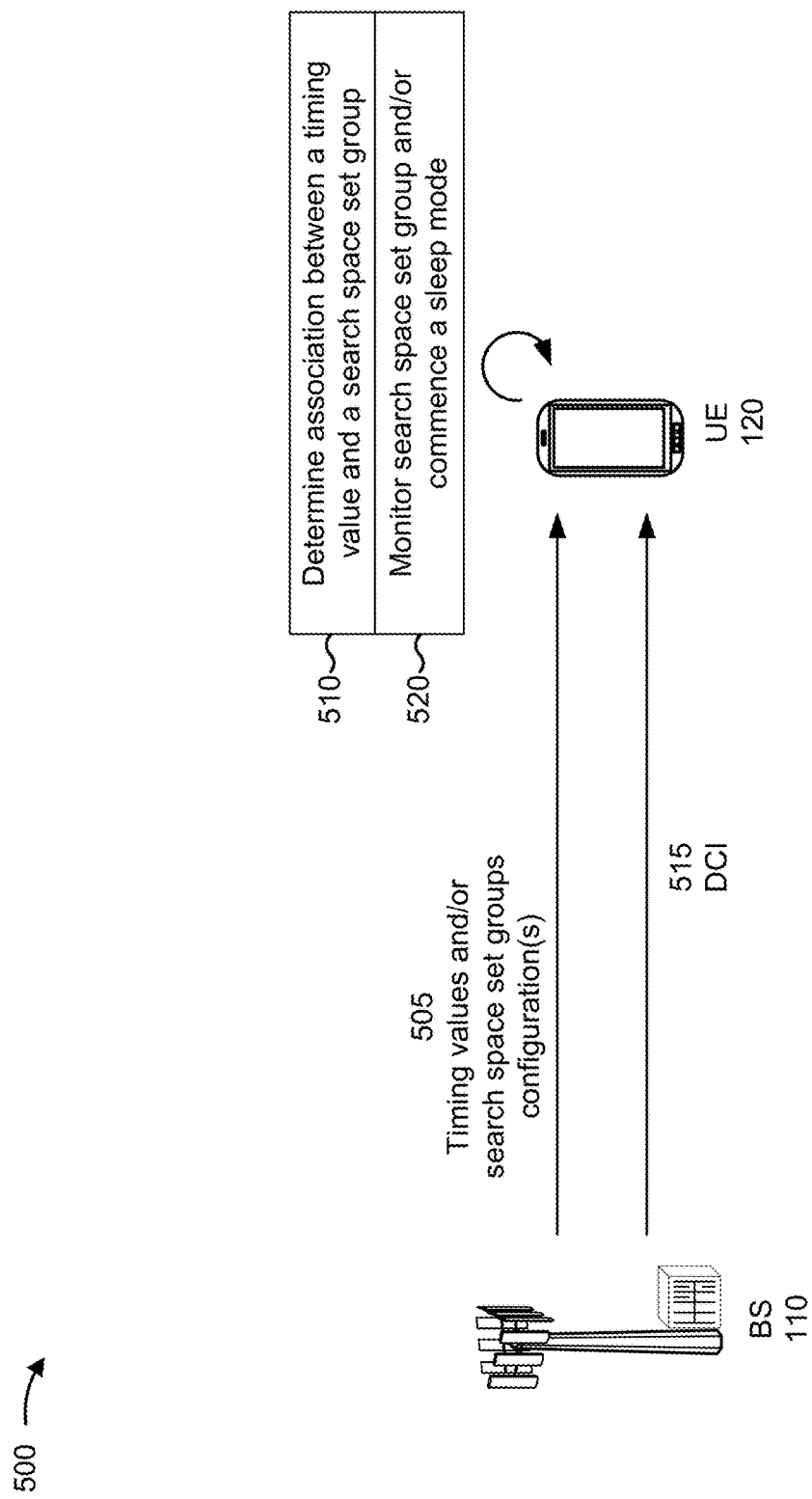
FIGS. 5 and 6 are diagrams illustrating examples of power saving based on a combined timing indication and search space set group indication, in accordance with various aspects of the present disclosure.

FIG. 5 is a diagram illustrating an example 500 of power saving based on a combined timing indication and search space set group indication, in accordance with various aspects of the present disclosure. As shown in FIG. 5, a UE 120 may communicate with a BS 110 in connection with timing indication and search space set group indication. In some aspects, communication between UE 120 and BS 110 may occur in unlicensed spectrum or licensed spectrum.

As shown in FIG. 5, and by reference number 505, BS 110 may transmit, and UE 120 may receive, one or more configurations relating to timing values (e.g., minimum timing values) and/or search space set groups. In some aspects, BS 110 may transmit a search space set group configuration to UE 120. The search space set group configuration may identify a plurality of search space set groups. For example, the search space set group configuration may identify a first search space set group and a second search space set group. Each search space set group may be associated with one or more search space sets. In some aspects, one of the search space set groups may be smaller than the other of the search space set groups (e.g., one of the search space set groups may be associated with a lesser quantity of search space sets than the other of the search space set groups). In some aspects, the search space set group configuration may identify each search space set group by a respective identifier (e.g., a respective index).

In some aspects, BS 110 may transmit an initial timing value configuration to UE 120. For example, the initial timing value configuration may be a PDSCH configuration or a physical uplink shared channel (PUSCH) configuration. The initial timing value configuration may identify one or more minimum timing values (e.g., K0 values, such as in a case of a PDSCH configuration, or K2 values, such as in a case of a PUSCH configuration). In some aspects, the UE 120 may select a timing value from the one or more timing values according to one or more criteria (e.g., according to a bandwidth part, a carrier, a resource, and/or the like, that UE 120 is using). Accordingly, the initial timing value configuration may identify a first timing value (e.g., a first minimum timing value) that is to be used by UE 120.

In some aspects, BS 110 may transmit a subsequent timing value configuration to UE 120. For example, the subsequent timing value configuration may identify one or more minimum timing values that UE 120 is to use (e.g., for a power saving mode). In some aspects, the subsequent timing value configuration may identify a subset of the one or more timing values of the initial timing value configuration. In a manner similar to that described above, UE 120 may select a timing value from the subset of the one or more timing values according to one or more criteria. Accordingly, the subsequent timing value configuration may identify a second timing value (e.g., a second minimum timing value) that is to be used by UE 120.

As shown by reference number 510, UE 120 may determine an association between a timing value and a search space set group. In some aspects, UE 120 may determine an association between a timing value and a search space set group based at least in part on a rule for determining associations. For example, the rule may prescribe that a first timing value (e.g., an initial timing value configured for the UE) is to be associated with a first search space set group (e.g., a search space set group associated with a lowest identifier, a search space set group associated with a highest identifier, and/or the like), and prescribe that a second timing value (e.g., a subsequent timing value configured for the UE) is to be associated with a second search space set group (e.g., a search space set group associated with a lowest identifier, a search space set group associated with a highest identifier, and/or the like).

In some aspects, UE 120 may determine an association between a timing value and a search space set group based at least in part on an association indication provided by BS 110. For example, the association indication may indicate that a first timing value (e.g., an initial timing value configured for the UE) is to be associated with a first search space set group (e.g., a search space set group associated with a lowest identifier, a search space set group associated with a highest identifier, and/or the like), and indicate that a second timing value (e.g., a subsequent timing value configured for the UE) is to be associated with a second search space set group (e.g., a search space set group associated with a lowest identifier, a search space set group associated with a highest identifier, and/or the like). In some aspects, the association indication may modify a rule-based association previously determined by UE 120. The association indication may be via radio resource control (RRC) signaling, a medium access control (MAC) control element (CE), DCI, and/or the like.

In some aspects, UE 120 may determine associations between timing values and search space set groups (e.g., according to a rule or an association indication, as described above) such that a first timing value and search space set group combination may correspond to a power saving state of UE 120, and a second timing value and search space set group combination may correspond to a non-power saving state of UE 120. For example, the power saving state of UE 120 may correspond to a largest timing value, of the first and second timing values, and a smallest search space set group of the first and second search space set groups. In this way, UE 120 may switch to the power saving state from the non-power saving state according to an indication from BS 110, thereby providing improved power saving for UE 120. In some aspects, UE 120 may determine a plurality of associations (e.g., more than two) between timing values and search space set groups, which may correspond to a plurality of power saving states of the UE 120.

As shown by reference number 515, BS 110 may transmit, and UE 120 may receive, DCI scheduling a communication of UE 120. In some aspects, the DCI may indicate a timing value (e.g., a minimum timing value) that provides an indication of a slot timing for the communication (e.g., a slot in which the communication is to be transmitted or received by UE 120). For example, the timing value may indicate a timing between a downlink grant included in the DCI and reception of a corresponding downlink data communication (e.g., a K0 value), a timing between reception of an uplink grant included in the DCI and transmission of a corresponding uplink data communication (e.g., a K2 value), and/or the like.

In some aspects, the DCI (e.g., in DCI format 0-1 or 1_1) may indicate the timing value in a single bit of the DCI. For example, a first value of the bit may indicate a first timing value (e.g., according to the initial timing value configuration) and a second value of the bit may indicate a second timing value (e.g., according to the subsequent timing value configuration). Moreover, according to the associations between timing values and search space set groups, the first value of the bit also may indicate a first search space set group and the second value of the bit also may indicate a second search space set group. In other words, the DCI may include a combined indication (e.g., in a single bit of the DCI, a single field of the DCI, and/or the like) of a timing value and a search space set group. Accordingly, the first value of the bit may indicate the power saving state (e.g., a first timing value and search space set group combination), and the second value of the bit may indicate the non-power saving state (e.g., a second timing value and search space set group combination).

In some aspects, BS 110 may determine the combined indication that is to be indicated by the DCI based at least in part on whether UE 120 is to be in the power saving state or the non-power saving state. For example, BS 110 may determine that UE 120 is to be in the non-power saving state when UE 120 is to monitor PDCCHs more frequently, when UE 120 is to receive and/or transmit data faster, and/or the like. Accordingly, BS 110 may determine that UE 120 is to be in the power saving state when UE 120 is not to be in the non-power saving state.

As shown by reference number 520, UE 120 may monitor a search space set group and/or commence a sleep mode based at least in part on the DCI. In some aspects, UE 120 may monitor the search space set group associated with the combined indication indicated by the DCI. In some aspects, UE 120 may commence a sleep mode for a duration associated with the timing value (e.g., the minimum timing value) indicated by the DCI (or not commence a sleep mode when the duration associated with the timing value is zero).

In some aspects, the timing value indicated by the DCI may be different from another timing value indicated by previous DCI received by UE 120. In such a case, UE 120 may determine to switch from using a sleep mode duration associated with the other timing value to using a sleep mode duration associated with the timing value. Moreover, in some aspects, the search space set group indicated by the DCI may be different from another search space set group indicated by previous DCI received by UE 120. In such a case, UE 120 may determine to switch from monitoring the other search space set group (e.g., associated with the other timing value) to monitoring the search space set group (e.g., associated with the timing value). In this way, UE 120 may switch between the power saving state and the non-power saving state based at least in part on the combined indication indicated by the DCI.

As indicated above, FIG. 5 is provided as an example. Other examples may differ from what is described with respect to FIG. 5.

Figure 6:
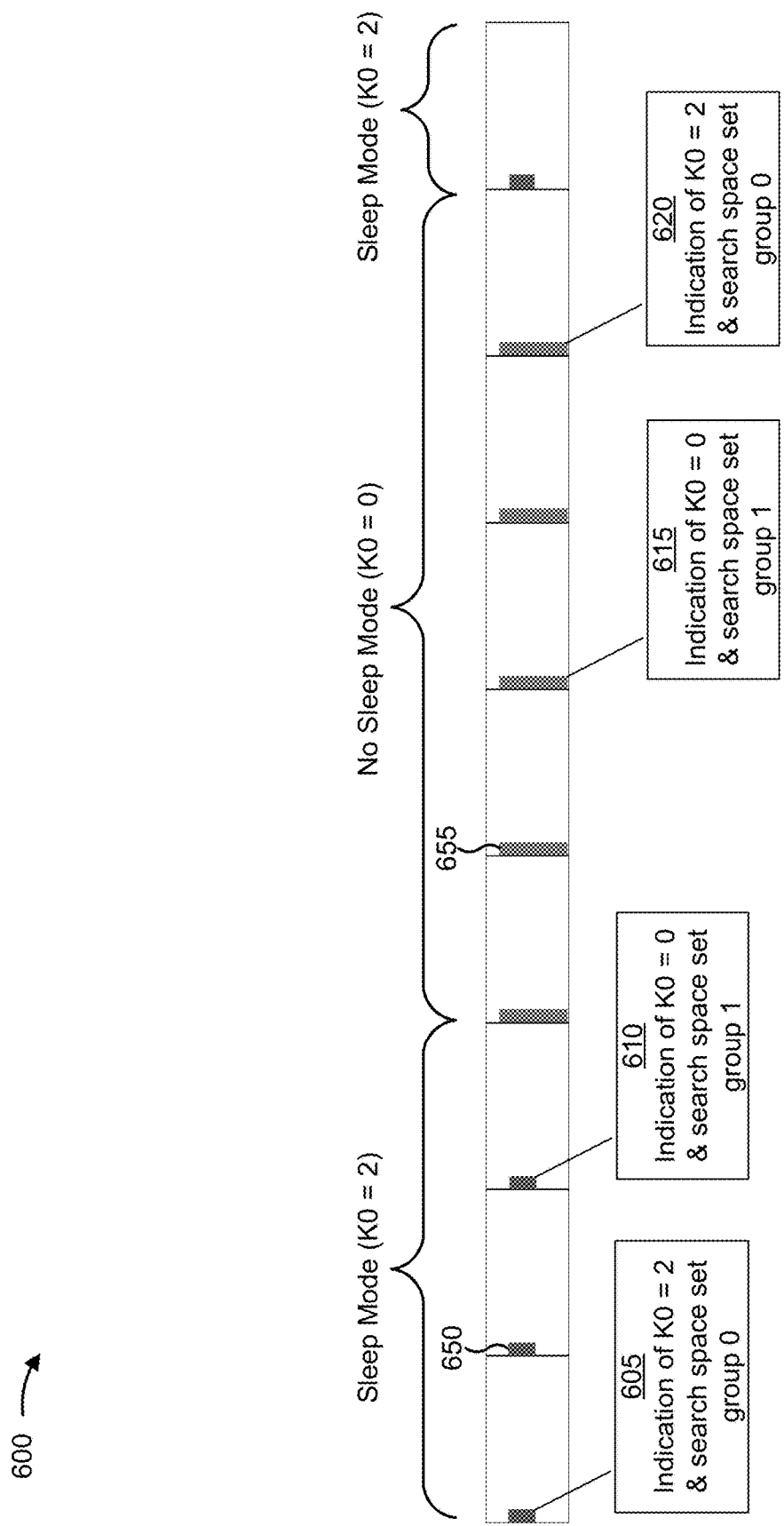

FIG. 6 is a diagram illustrating an example 600 of power saving based on a combined timing indication and search space set group indication, in accordance with various aspects of the present disclosure. In particular, example 600 shows switching (e.g., by a UE) between timing values (e.g., K0) and associated search space set groups according to an indication in DCI. The DCI may be transmitted by a base station, such as BS 110, and may be received by a UE, such as UE 120.

As shown in FIG. 6, the UE may receive, in a slot, first DCI 605 with a first combined indication of a timing value (K0=2) and search space set group (search space set group 0, shown by reference number 650). Based at least in part on the first DCI 605, the UE may monitor the first search space set group 650 associated with the timing value and/or commence a sleep mode for a duration associated with the timing value. The UE may receive, in a slot, second DCI 610 with a second combined indication of a timing value (K0=0) and search space set group (search space set group 1, shown by reference number 655). Based at least in part on the second DCI 610, the UE may switch from monitoring the search space set group 650 to monitoring the search space set group 655 associated with the timing value and/or discontinue the sleep mode (e.g., because K0=0).

As further shown in FIG. 6, the UE may receive, in a slot, third DCI 615 with the second combined indication. Based at least in part on the third DCI 615, the UE may continue to monitor the second search space set group 655 without the sleep mode. That is, the UE may not switch search space set groups or sleep modes because the combined indication did not change from the second DCI 610 to the third DCI 615. The UE may receive, in a slot, fourth DCI 620 indicating the first combined indication. Based at least in part on the fourth DCI 620, the UE may switch from monitoring the second search space set group 655 to monitoring the first search space set group 650 associated with the first timing value and/or commence the sleep mode for a duration associated with the first timing value.

As indicated above, FIG. 6 is provided as an example. Other examples may differ from what is described with respect to FIG. 6.

FIG. 7 is a diagram illustrating an example process 700 performed, for example, by a UE, in accordance with various aspects of the present disclosure. Example process 700 is an example where the UE (e.g., UE 120) performs operations associated with power saving based on a combined timing indication and search space set group indication.

As shown in FIG. 7, in some aspects, process 700 may include receiving DCI that includes a combined indication of a minimum timing value, associated with a timing for transmission or reception of a communication corresponding to the DCI, and a search space set group (block 710). For example, the UE (e.g., using antenna 252, DEMOD 254, MIMO detector 256, receive processor 258, controller/processor 280, and/or memory 282) may receive DCI that includes a combined indication of a minimum timing value, associated with a timing for transmission or reception of a communication corresponding to the DCI, and a search space set group, as described above.

As further shown in FIG. 7, in some aspects, process 700 may include monitoring the search space set group, or commencing a sleep mode, based at least in part on the DCI (block 720). For example, the UE (e.g., using antenna 252, DEMOD 254, MIMO detector 256, receive processor 258, controller/processor 280, and/or memory 282) may monitor the search space set group, or commence a sleep mode, based at least in part on the DCI, as described above.

Process 700 may include additional aspects, such as any single aspect or any combination of aspects described below and/or in connection with one or more other processes described elsewhere herein.

In a first aspect, the sleep mode is for a duration associated with the minimum timing value.

In a second aspect, alone or in combination with the first aspect, the minimum timing value is different from another timing value indicated by previous DCI received by the UE, and monitoring the search space set group includes switching from monitoring another search space set group associated with the other timing value to monitoring the search space set group associated with the minimum timing value.

In a third aspect, alone or in combination with one or more of the first and second aspects, process 700 includes receiving one or more configurations that indicate the minimum timing value, another timing value, the search space set group, and another search space set group.

In a fourth aspect, alone or in combination with one or more of the first through third aspects, process 700 includes determining an association between the minimum timing value and the search space set group, and an association between the other timing value and the other search space set group, based at least in part on a rule for determining associations.

In a fifth aspect, alone or in combination with one or more of the first through fourth aspects, process 700 includes receiving a configuration that indicates an association between the minimum timing value and the search space set group, and an association between the other timing value and the other search space set group.

In a sixth aspect, alone or in combination with one or more of the first through fifth aspects, the configuration is received via radio resource control signaling.

In a seventh aspect, alone or in combination with one or more of the first through sixth aspects, the combined indication is in a single bit of the DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where the base station (e.g., base station 110) performs operations associated with power saving based on a combined timing indication and search space set group indication.

As shown in FIG. 8, in some aspects, process 800 may include determining a minimum timing value, associated with a timing for transmission or reception of a communication by a UE, and a search space set group for the UE (block 810). For example, the base station (e.g., using controller/processor 240, memory 242, and/or scheduler 246) may determine a minimum timing value, associated with a timing for transmission or reception of a communication by a UE, and a search space set group for the UE, as described above.

As further shown in FIG. 8, in some aspects, process 800 may include transmitting DCI that includes a combined indication of the minimum timing value and the search space set group (block 820). For example, the base station (e.g., using transmit processor 220, TX MIMO processor 230, modulator 232, antenna 234, controller/processor 240, memory 242, and/or scheduler 246) may transmit DCI that includes a combined indication of the minimum timing value and the search space set group, as described above.

Process 800 may include additional aspects, such as any single aspect or any combination of aspects described below and/or in connection with one or more other processes described elsewhere herein.

In a first aspect, the DCI indicates that the UE is to monitor the search space set group or commence a sleep mode for a duration associated with the minimum timing value.

In a second aspect, alone or in combination with the first aspect, the minimum timing value is different from another timing value indicated by previous DCI transmitted by the base station, and the DCI indicates that the UE is to switch from monitoring another search space set group associated with the other timing value to monitoring the search space set group associated with the minimum timing value.

In a third aspect, alone or in combination with one or more of the first and second aspects, process 800 includes transmitting one or more configurations that indicate the minimum timing value, another timing value, the search space set group, and another search space set group.

In a fourth aspect, alone or in combination with one or more of the first through third aspects, process 800 includes determining an association between the minimum timing value and the search space set group, and an association between the other timing value and the other search space set group before transmitting the one or more configurations.

In a fifth aspect, alone or in combination with one or more of the first through fourth aspects, process 800 includes transmitting a configuration that indicates an association between the minimum timing value and the search space set group, and an association between the other timing value and the other search space set group.

In a sixth aspect, alone or in combination with one or more of the first through fifth aspects, the configuration is transmitted via radio resource control signaling.

In a seventh aspect, alone or in combination with one or more of the first through sixth aspects, the combined indication is in a single bit of the DCI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a first configuration, identifying a first minimum timing value and a second minimum timing value, and a second configuration, identifying a first search space set group and a second search space set group;
determining, based at least in part on receiving the first configuration and the second configuration and further based at least in part on a rule for determining one or more associations, a first association, between a particular minimum timing value and a particular search space set group, and a second association, between another particular minimum timing value and another particular search space set group,
wherein the particular minimum timing value is one of the first minimum timing value or the second minimum timing value, and the other particular minimum timing value is another one of the first minimum timing value or the second minimum timing value,
wherein the particular search space set group is one of the first search space set group or the second search space set group, and the other particular search space set group is another one of the first search space set group or the second search space set group, and
wherein the first minimum timing value and the second minimum timing value are associated with a timing for transmission or reception of a communication by the UE;
receiving, based at least in part on determining the first association, downlink control information (DCI) that includes a combined indication of the particular minimum timing value and the particular search space set group of the first association; and
monitoring the particular search space set group, or commencing a sleep mode, based at least in part on the DCI.

2. The method of claim 1, wherein the sleep mode is for a duration associated with the particular minimum timing value.

3. The method of claim 1, wherein:
the particular minimum timing value is the first minimum timing value and the particular search space set group is the first search space set group,
the first minimum timing value is associated with the first search space set group and the second minimum timing value is associated with the second search space set group,
the first minimum timing value is different from the second minimum timing value indicated by previous DCI received by the UE, and
monitoring the particular search space set group or commencing the sleep mode comprises:
switching from monitoring the second search space set group to monitoring the first search space set group.

4. The method of claim 1, wherein at least one of the first configuration or the second configuration is received via radio resource control signaling.

5. The method of claim 1, wherein the combined indication is in a single bit of the DCI.

6. The method of claim 5, wherein the single bit comprises a plurality of values including a value, indicating the combined indication, and another value, indicating another combined indication of the other particular minimum timing value and the other particular search space set group.

7. A method of wireless communication performed by a network node, comprising:
transmitting a first configuration, identifying a first minimum timing value and a second minimum timing value, and a second configuration, identifying a first search space set group and a second search space set group;
transmitting, based at least in part on transmitting the first configuration and the second configuration and further based at least in part on a rule for determining one or more associations, a first association indication, for determining a first association between a particular minimum timing value and a particular search space set group, and a second association indication, for determining second association between another particular minimum timing value and another particular search space set group,
wherein the particular minimum timing value is one of the first minimum timing value or the second minimum timing value, and the other particular minimum timing value is another one of the first minimum timing value or the second minimum timing value,
wherein the particular search space set group is one of the first search space set group or the second search space set group, and the other particular search space set group is another one of the first search space set group or the second search space set group, and
wherein the first minimum timing value and the second minimum timing value are associated with a timing for transmission or reception of a communication by a user equipment (UE); and
transmitting, based at least in part on transmitting the first association indication, downlink control information (DCI) that includes a combined indication of the particular minimum timing value and the particular search space set group of the first association.

8. The method of claim 7, wherein the DCI indicates that the UE is to monitor the particular search space set group or commence a sleep mode for a duration associated with the particular minimum timing value.

9. The method of claim 7, wherein:
the particular minimum timing value is the first minimum timing value and the particular search space set group is the first search space set group,
the first minimum timing value is associated with the first search space set group and the second minimum timing value is associated with the second search space set group,
the first minimum timing value is different from the second minimum timing value indicated by previous DCI transmitted by the network node, and
the DCI indicates that the UE is to switch from monitoring the second search space set group to monitoring the first search space set group.

10. The method of claim 7, wherein at least one of the first configuration or the second configuration is transmitted via radio resource control signaling.

11. The method of claim 7, wherein the combined indication is in a single bit of the DCI.

12. The method of claim 11, wherein the single bit comprises a plurality of values including a value, indicating the combined indication, and another value, indicating another combined indication of the other particular minimum timing value and the other particular search space set group.

13. A user equipment (UE) for wireless communication, comprising:
memory;
one or more processors coupled to the memory; and
instructions stored in the memory and operable, when executed by the one or more processors, to cause the UE to:
receive a first configuration, identifying a first minimum timing value and a second minimum timing value, and a second configuration, identifying a first search space set group and a second search space set group;
determine, based at least in part on receiving the first configuration and the second configuration and further based at least in part on a rule for determining one or more associations, a first association, between a particular minimum timing value and a particular search space set group, and a second association, between another particular minimum timing value and another particular search space set group,
wherein the particular minimum timing value is one of the first minimum timing value or the second minimum timing value, and the other particular minimum timing value is another one of the first minimum timing value or the second minimum timing value,
wherein the particular search space set group is one of the first search space set group or the second search space set group, and the other particular search space set group is another one of the first search space set group or the second search space set group, and
wherein the first minimum timing value and the second minimum timing value are associated with a timing for transmission or reception of a communication by the UE;
receive, based at least in part on determining the first association, downlink control information (DCI) that includes a combined indication of the particular minimum timing value and the particular search space set group; and
monitor the particular search space set group, or commence a sleep mode, based at least in part on the DCI.

14. The UE of claim 13, wherein the sleep mode is for a duration associated with the particular minimum timing value.

15. The UE of claim 13, wherein:
the particular minimum timing value is the first minimum timing value and the particular search space set group is the first search space set group,
the first minimum timing value is associated with the first search space set group and the second minimum timing value is associated with the second search space set group,
the first minimum timing value is different from the second minimum timing value indicated by previous DCI received by the UE, and
the one or more processors, when monitoring the particular search space set group, are configured to:
switch from monitoring the second search space set group to monitoring the first search space set group.

16. The UE of claim 13, wherein the combined indication is in a single bit of the DCI.

17. The UE of claim 16, wherein the single bit comprises a plurality of values including a value, indicating the combined indication, and another value, indicating another combined indication of the other particular minimum timing value and the other particular search space set group.

18. The UE of claim 13, wherein at least one of the first configuration or the second configuration is received via radio resource control signaling.

19. A network node for wireless communication, comprising:
memory;
one or more processors coupled to the memory; and
instructions stored in the memory and operable, when executed by the one or more processors, to cause the network node to:
transmit a first configuration, identifying a first minimum timing value and a second minimum timing value, and a second configuration, identifying a first search space set group and a second search space set group;
transmit, based at least in part on transmitting the first configuration and the second configuration and further based at least in part on a rule for determining one or more associations, a first association indication for determining a first association, between a particular minimum timing value and a particular search space set group, and a second association indication, for determining second association between another particular minimum timing value and another particular search space set group,
wherein the particular minimum timing value is one of the first minimum timing value or the second minimum timing value, and the other particular minimum timing value is another one of the first minimum timing value or the second minimum timing value,
wherein the particular search space set group is one of the first search space set group or the second search space set group, and the other particular search space set group is another one of the first search space set group or the second search space set group, and
wherein the first minimum timing value and the second minimum timing value are associated with a timing for transmission or reception of a communication by a user equipment (UE); and
transmit, based at least in part on transmitting the first association indication, downlink control information (DCI) that includes a combined indication of the particular minimum timing value and the particular search space set group.

20. The network node of claim 19, wherein the DCI indicates that the UE is to monitor the particular search space set group or commence a sleep mode for a duration associated with the particular minimum timing value.

21. The network node of claim 19, wherein:
the particular minimum timing value is the first minimum timing value and the particular search space set group is the first search space set group,
the first minimum timing value is associated with the first search space set group and the second minimum timing value is associated with the second search space set group,
the first minimum timing value is different from the second minimum timing value indicated by previous DCI transmitted by the network node, and
the DCI indicates that the UE is to switch from monitoring the second search space set group to monitoring the first search space set group.

22. The network node of claim 19, wherein the combined indication is in a single bit of the DCI.

23. The network node of claim 22, wherein the single bit comprises a plurality of values including a value, indicating the combined indication and another value, indicating another combined indication of the other particular minimum timing value and the other particular search space set group.

24. The network node of claim 19, wherein at least one of the first configuration or the second configuration is received via radio resource control signaling.

* * * * *